(12) United States Patent
Langford et al.

(10) Patent No.: US 7,743,274 B2
(45) Date of Patent: Jun. 22, 2010

(54) ADMINISTERING CORRELATED ERROR LOGS IN A COMPUTER SYSTEM

(75) Inventors: John S. Langford, Austin, TX (US); Atit D. Patel, Austin, TX (US); Joshua N. Poimboeuf, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 11/854,329

(22) Filed: Sep. 12, 2007

(65) Prior Publication Data

US 2009/0070639 A1    Mar. 12, 2009

(51) Int. Cl.
    *G06F 11/00*      (2006.01)
(52) U.S. Cl. .......................................... 714/4
(58) Field of Classification Search ............... 714/2–4, 714/6–8, 11, 13, 15, 16, 18, 20, 26, 37–39, 714/45, 48
See application file for complete search history.

(56) References Cited

U.S. PATENT DOCUMENTS

| | | | | |
|---|---|---|---|---|
| 4,980,857 | A * | 12/1990 | Walter et al. | 714/45 |
| 5,528,759 | A | 6/1996 | Moore | |
| 5,987,621 | A * | 11/1999 | Duso et al. | 714/4 |
| 6,832,341 | B1 | 12/2004 | Vijayan | |
| 7,028,218 | B2 * | 4/2006 | Schwarm et al. | 714/11 |
| 2002/0188711 | A1 * | 12/2002 | Meyer et al. | 709/223 |
| 2006/0047995 | A1 * | 3/2006 | Schriek | 714/2 |
| 2006/0117212 | A1 * | 6/2006 | Meyer et al. | 714/4 |
| 2009/0055679 | A1 * | 2/2009 | Langford et al. | 714/4 |
| 2009/0070639 | A1 * | 3/2009 | Langford et al. | 714/57 |
| 2009/0077412 | A1 * | 3/2009 | Langford et al. | 714/4 |

FOREIGN PATENT DOCUMENTS

JP      11306050 A      11/1999

OTHER PUBLICATIONS

Kawamura et al.; Log Data Extraction and Correlation Miner for Lithography Management System: LMS-LEC; Proceedings of the SPIE: Data Analysis and Modeling for Process Control II; Mar. 3-4, 2005; pp. 231-235; vol. 5755; SPIE; Bellingham, WA, USA.
Shand et al.; Traceability and Timeliness in Messaging Middleware; On The Move to Meaningful Internet Systems 2006: OTM 2006 Workshops, Proceedings Part II; Oct. 29-Nov. 3, 2006; pp. 1551-1554; Springer.

* cited by examiner

*Primary Examiner*—Nadeem Iqbal
(74) *Attorney, Agent, or Firm*—Edward J. Lenart; Libby Z. Toub; Biggers & Ohanian LLP.

(57) ABSTRACT

Administering correlated error logs in a computer system having a system controller and one or more redundant node controllers including providing by the system controller to a redundant node controller a unique identifier for error logs; detecting by the system controller a communications failure between the system controller and the redundant node controller; in response to detecting the communications failure, generating by the system controller a system controller error log for the communications failure including the unique identifier; detecting by the redundant node controller the communications failure between the system controller and the redundant node controller; and in response to detecting the communications failure, generating by the redundant node controller a redundant node controller error log for the communications failure including the unique identifier.

20 Claims, 4 Drawing Sheets

ADMINISTERING CORRELATED ERROR LOGS IN A COMPUTER SYSTEM

BACKGROUND OF THE INVENTION

1. Field of the Invention

The field of the invention is data processing, or, more specifically, methods, apparatus, and products for administering correlated error logs in a computer system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

The combination of hardware and software components in computer systems today has progressed to the point that computer systems can be highly reliable. Reliability in computer systems may be provided by using redundant components in the computer system. In some computer systems, for example, components such as node controllers that manage hardware error requests in nodes of the computer system are provided in redundant pairs—one primary node controller, one redundant node controller. When such a primary node controller fails, the redundant node controller takes over the primary node controller's operations.

From time to time a single point of failure may cause a loss of communications between many devices in the computer system. Each device typically generates an error log corresponding to the failure the device experienced. The error logs are used by a system administrator to identify and debug the single point of failure that caused the loss of communications. Current processes of debugging a failure require manual parsing of the error logs and manual arrangement of the error logs in an order in which actual events occurred. Error logs, however, may not be received at or near the same time, nor is there any guarantee the error logs include a time-stamp indicating the same time of the failure. Moreover, many distinct failures may occur in a computer system during a short period of time, resulting in a collection of many error logs for each distinct failure. Using the disparate collection of error logs to debug and identify the distinct failures under current processes is time consuming, an inefficient, requiring a manual and inexact correlation of the error logs to a particular underlying failure. Readers of skill in the art will recognize therefore that there exists room for improvement in administering correlated error logs in a computer system.

SUMMARY OF THE INVENTION

Methods, apparatus, and products for administering correlated error logs in a computer system having a system controller and one or more redundant node controllers are disclosed that include providing by the system controller to a redundant node controller a unique identifier for error logs; detecting by the system controller a communications failure between the system controller and the redundant node controller; in response to detecting the communications failure, generating by the system controller a system controller error log for the communications failure including the unique identifier; detecting by the redundant node controller the communications failure between the system controller and the redundant node controller; and in response to detecting the communications failure, generating by the redundant node controller a redundant node controller error log for the communications failure including the unique identifier.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
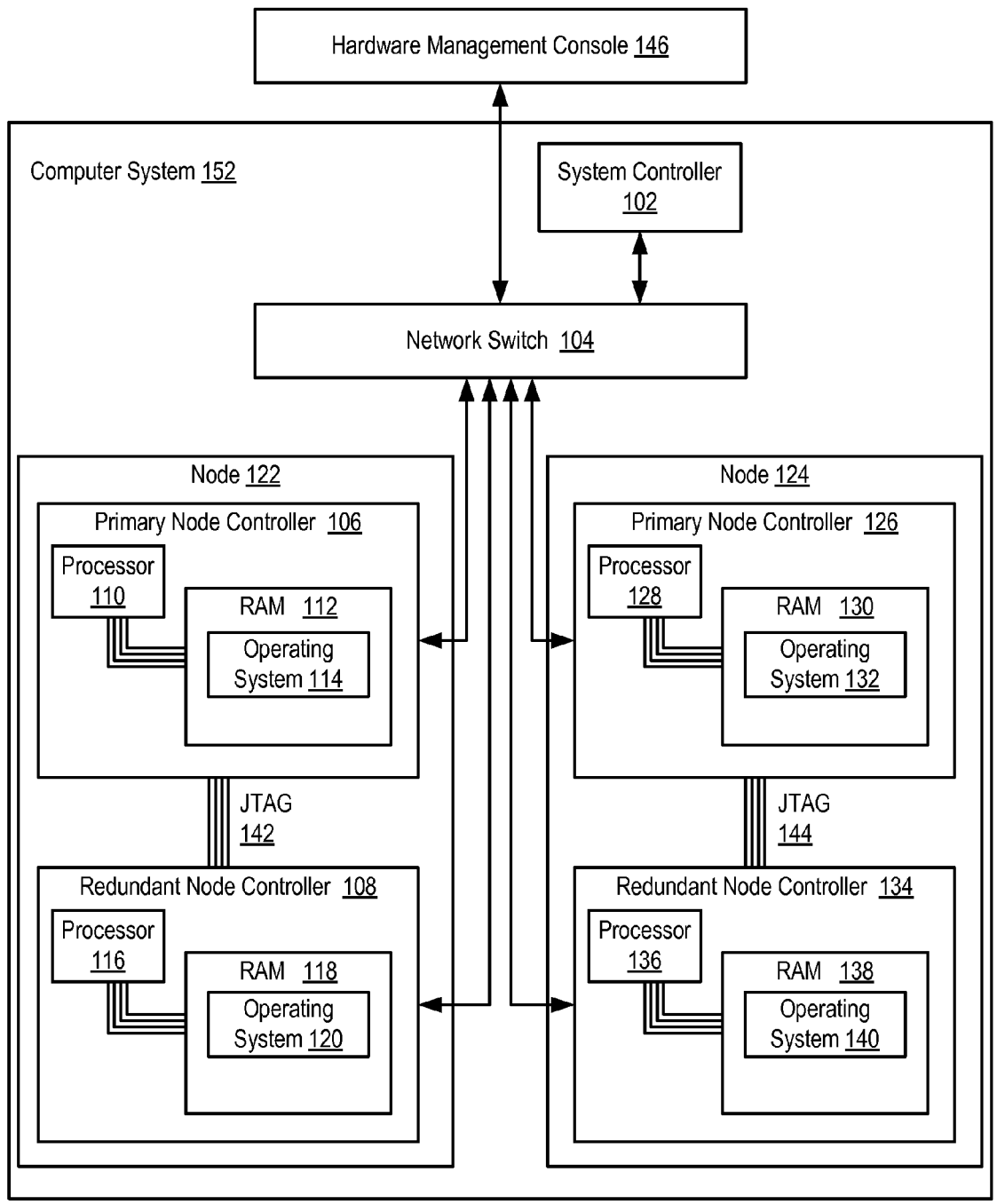
FIG. 1 sets forth a block diagram of automated computing machinery comprising an exemplary computer system useful in administering correlated error logs in a computer system according to embodiments of the present invention.

Exemplary methods, apparatus, and products for administering correlated error logs in a computer system in accordance with the present invention are described with reference to the accompanying drawings, beginning with FIG. 1. FIG. 1 sets forth a block diagram of automated computing machinery comprising an exemplary computer system (152) useful in administering correlated error logs in a computer system according to embodiments of the present invention. The computer system of FIG. 1 is an example of 'distributed' computer system (152). The term 'distributed' as used in this specification describes a computer system that includes multiple, physically distinct devices that operate together as a single computer system. The computer system (152) of FIG. 1, for example, includes several physically discrete devices such as a system controller, a network switch, and two nodes (122, 124).

A node is a processing device contained in computer system that executes user applications. A node may be a web server, a database, or any other computing device. Although not shown here, nodes may include any number of devices such as computer processors, computer memory, disk drive adapters, disk drives, communication adapters, bus adapters, and so on as will occur to those of skill in the art. The computer system (152) of FIG. 1 is configured with only two nodes (122,124), but readers of skill in the art will immediately recognize that computer systems useful in administering a system dump on a redundant node controller of a computer according to embodiments of the present invention may include any number of nodes. In typical embodiments of the present invention, for example, a computer system may include from one to eight nodes.

Each node (122,124) in the system of FIG. 1 includes two node controllers configured as a set of buddies. A node controller is a device contained in a node that attends to any hardware error requests of the node that occur during operation of the computer system. In the exemplary computer system (152) of FIG. 1 each node controller (106,108,126, 134) contains a computer processor (110,116,128,136) operatively coupled to computer memory, RAM (112,118, 130,138). Store in RAM in each of the node controllers is an operating system (114,120,132,140). Operating systems useful in node controllers according to embodiments of the present invention include UNIX™, Linux™, Microsoft XP™, Microsoft Vista™, AIX™, IBM's i5/OS™, and others as will occur to those of skill in the art.

As mentioned above the two node controllers contained in each node are configured as a set of buddies. A set of buddies is a group of node controllers that provides, as a group, reliable node controller operations due to redundancy—when one node controller fails another redundant node controller takes over node controller operations for the node of the computer system. In the exemplary computer (152) of FIG. 1, primary node controller's (106) buddy is the redundant node controller (108) and vice versa. Also in the exemplary computer (152) of FIG. 1, primary node controller's (126) buddy is redundant node controller (134) and vice versa.

Only one node controller in a set of buddies is configured as a primary node controller at one time. The primary node controller is the node controller in which all node controller operations are carried out for a node of the computer system. A redundant node controller, in contrast, carries out no node controller operations for the node of the computer system until the primary node controller fails. Communication between node controllers in a node occurs through two different communications channels. Primary, in-band, data communications between the node controllers in a node occurs through the network switch. Such data communications may be carried out using any network protocol such as for example, Stream Control Transport Protocol ('SCTP'), TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Data communications other than primary data communications, called out-of-band data communications, is carried out through an out-of-band data communications link.

In the system of FIG. 1 the out-of-band data communication link for each set of node controllers are implemented as Joint Test Action Group ('JTAG') data communications links (142,144). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. Although the out-of-band data communication links in the exemplary system of FIG. 1 are implemented as a JTAG communications link one of skill in the art will recognize that the out-of-band data communication link may be implemented as any data communications link capable of enabling out-of-band communication between node controllers in a node including, for example, such data communications links as:

I$^2$C bus, a serial computer bus invented by Philips that is used to for low-speed communications with peripheral components of a system. The name stands for Inter-Integrated Circuit and is pronounced I-squared-C or sometimes as I-two-C.

1-Wire bus, a device communications bus system designed by Dallas Semiconductor that provides low-speed data, signaling and power over a single wire, in addition to a ground wire. 1-Wire is similar in concept to I$^2$C, but with lower data rates and a much lower cost. It is typically used to communicate with small inexpensive devices.

System Management Bus ('SMBus'), a two-wire bus used for communication with low-bandwidth devices on a motherboard, especially power related chips. Other devices might include temperature sensors and lid switches. A device can provide manufacturer information, indicate its model/part number, save its state for a suspend event, report errors, accept control parameters, and return status using SMB.

Serial Peripheral Interface ('SPI'), a synchronous serial data link standard named by Motorola that operates in full duplex mode. Devices communicate in master/slave mode where the master device initiates the data frame. Multiple slave devices are enabled using separate select lines.

Intelligent platform management bus ('IPMB'), an enhanced implementation of I$^2$C, the IPMB connects a baseboard management controller to other controllers for communication via the intelligent platform management interface ('IPMI') specification. The IPMI specification defines a set of common interfaces to computer hardware and firmware which system administrators can use to monitor system health and manage the system.

Others as will occur to those of skill in the art.

A system controller (102) is a controller that manages nodes in a computer system. System controllers may collect error and operational status information from nodes during the operation of the computer system as well as direct operations of the nodes. Although only one system controller is shown in FIG. 1 for clarity in some embodiments of the present invention the computer system (152) also includes a redundant system controller to provide reliability. A system controller is connected for data communications to the nodes (122,124) through a network switch (104).

System administrators may use the system controller (102), through a hardware management console (146), to administer hardware contained within the computer system (152). A hardware management console is automated computing machinery and computer program instructions operating on the automated computing machinery that provide a standard interface to users for configuring and operating the computer system. Such a hardware management console is typically connected for data communications to the nodes of the computer system through the network switch (104) or other network device, such as a router.

A network switch is a computer networking device that connects network segments. Devices connected to the network switch may communicate with one other another according to any data communications protocol as will occur to those of skill in the art, including for example, TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. A network switch is typically capable of inspecting data packets from a networked entity as the data packets are received, determining the source and destination device of each packet, and forwarding each data packet to the appropriate destination device. Some network switches are configured for additional operations. The network switch of FIG. 1, for example, is capable of answering queries of the system controller concerning network connectivity. From time to time a system controller may query the network switch to determine if a particular node, or node controller within a particular node, is physically connected to the network.

As mentioned above, the computer system (152) of FIG. 1 operates generally for administering correlated error logs. Administering correlated error logs in a computer system includes providing by the system controller (102) to a redundant node controller (108) a unique identifier for error logs; detecting by the system controller (102) a communications failure between the system controller (102) and the redundant node controller (108); in response to detecting the communications failure, generating by the system controller (102) a system controller error log for the communications failure including the unique identifier; detecting by the redundant node controller (108) the communications failure between the system controller (102) and the redundant node controller (108); and in response to detecting the communications failure, generating by the redundant node controller (108) a redundant node controller error log for the communications failure including the unique identifier (308).

A communications failure between a system controller and a redundant node controller may occur for many reasons. Applications running on either device may lockup or freeze, causing a communication failure between the two devices or the physical connection between the two devices may be disconnected. In many cases, a user causes a communications failure between a system controller and a redundant node controller by removing an Ethernet cable that connects the two devices through the network switch.

An error log is collection of operational information of a device in a computer system that has experienced an error. The log may consist of a variety of information including, for example, the time of the error, the type of error experienced by the device, the applications running on the device at the time of the error, and any other information as will occur to those of skill in the art. Error logs are used by system administrators to identify and debug the source of errors in a computer system. In typical computer systems having a system controller and node controllers, each controller is configured to create an error log upon experiencing an error. One error in a computer system may provoke several controllers to generate an error log. Because a computer system may have many different controllers and each may experience any number of errors provoking an error log, system administrators often have difficulty in correlating error logs that correspond to the same underlying error.

In the computer system of FIG. 1, providing by the system controller (102) to a redundant node controller (108) a unique identifier for error logs is carried out by transmitting, upon establishing communications between the system controller and redundant node controller, to the redundant node controller a Universally Unique Identifier ('UUID'). A UUID is an identifier according to the UUID standard, an identifier standard used in software construction, standardized by the Open Software Foundation ('OSF') as part of the Distributed Computing Environment ('DCE').

UUIDs enable distributed systems to uniquely identify information without significant central coordination. Although the unique identifier is described here as a UUID, the unique identifier may also be, for example, a count the is incremented each time the system controller establishes communication with a redundant node controller or any other identifier as will occur to those of skill in the art.

In the computer system of FIG. 1, detecting by the system controller (102) a communications failure between the system controller (102) and the redundant node controller (108) is carried out by identifying by the system controller (102) a failure by the redundant node controller to respond to a ping of a heartbeat for a predefined period of time (404). The term 'heartbeat' as used in this specification is any signal shared between two devices, the existence of which represents an active communication channel between the devices. The loss of a heartbeat represents a failure of the communication channel between the devices. In the system of FIG. 1, for example, the heartbeat between the system controller (102) and redundant node controller (108) may consist of a ping from the system controller, through the network switch (104) to the redundant node controller (108), followed by a response from the redundant node controller. A ping is a computer network tool used to test whether a particular device is reachable across a network. A ping may be carried out in several ways including, for example, by sending Internet Control Message Protocol ('ICMP') echo request packets to the device through the network and listening for an ICMP echo response, by transmitting between the devices custom ping-pong messages according to the Stream Control Transport Protocol ('SCTP'), or in other ways as will occur to those of skill in the art.

Consider for further explanation that the predefined period of time is one hour and that the system controller (102) of FIG. 1 is configured to ping the redundant node controller (108) every 15 seconds. If the system controller pings the redundant node controller every 15 seconds for one hour, but does not receive a response from the redundant node controller during the one hour, the system controller determines the loss of the heartbeat.

In response to detecting the communications failure, the system controller (102) generates a system controller error log for the communications failure including the unique identifier. In the computer system of FIG. 1, the system controller (102) generates a system controller error log by recording, in a data structure, operational information of the system controller corresponding to the communications failure and inserting the unique identifier in the data structure.

The computer system of FIG. 1 may also be configured to provide by the system controller (102) the system controller error log (304) to a hardware management console (146). The system controller may provide the system controller error log to the hardware management console through in-band data communications through the network switch (104) according to any data communication protocol including, for example, TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. The hardware management console (146) enables users and system administrators to use the error log to identify the underlying source causing the error.

In the computer system of FIG. 1, detecting by the redundant node controller (108) the communications failure between the system controller (102) and the redundant node controller (108) is carried out by identifying by the redundant node controller (108) a failure to receive a ping of a heartbeat from the system controller (102) for a predefined period of time. Consider for further explanation that the predefined period of time is 30 seconds and that the system controller (102) of FIG. 1 is configured to ping the redundant node controller (108) every 15 seconds. If the redundant node controller does not receive a ping from the system controller for 30 seconds, the redundant node controller determines the loss of the heartbeat.

In response to detecting the communications failure, the redundant node controller (108) generates a redundant node controller error log for the communications failure including the unique identifier. In the computer system of FIG. 1, the redundant node controller (108) generates a redundant node controller error log by recording, in a data structure, operational information of the redundant node controller corresponding to the communications failure and inserting the unique identifier in the data structure.

After generating the error log, the redundant node controller attempts to restore communication with the system controller (102) by periodically broadcasting a handshake initiation message through the network switch (104). In the system of FIG. 1, detecting by the redundant node controller (108) the restoration of communications between the system controller (102) and the redundant node controller (108) is carried out by identifying a response from the system controller to the handshake initiation message. In response to detecting the restoration of communications, the redundant node controller, provides the redundant node controller error log to the system controller (102). The redundant node controller (108) may provide the redundant node controller error log to the system controller (102) by transmitting the redundant node controller error log through in-band data communications through the network switch (104) according to any data communication protocol including, for example, TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art.

In the computer system of FIG. 1, after receiving the redundant node controller error log, the system controller (102) forwards to the hardware management console (146), the redundant node controller error log (322). Now having received both the system controller error log and the redundant node controller error log, a user at the hardware management console may use the error logs to identify and debug the underlying source causing the failure of communications between the system controller and redundant node controller. The hardware management console may be configured to correlate the error logs by associating those logs having the same unique identifier.

The arrangement of nodes, node controllers, switch, and system controller making up the exemplary computer system illustrated in FIG. 1 are for explanation, not for limitation. Computer systems useful according to various embodiments of the present invention may include additional nodes, servers, routers, other devices, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
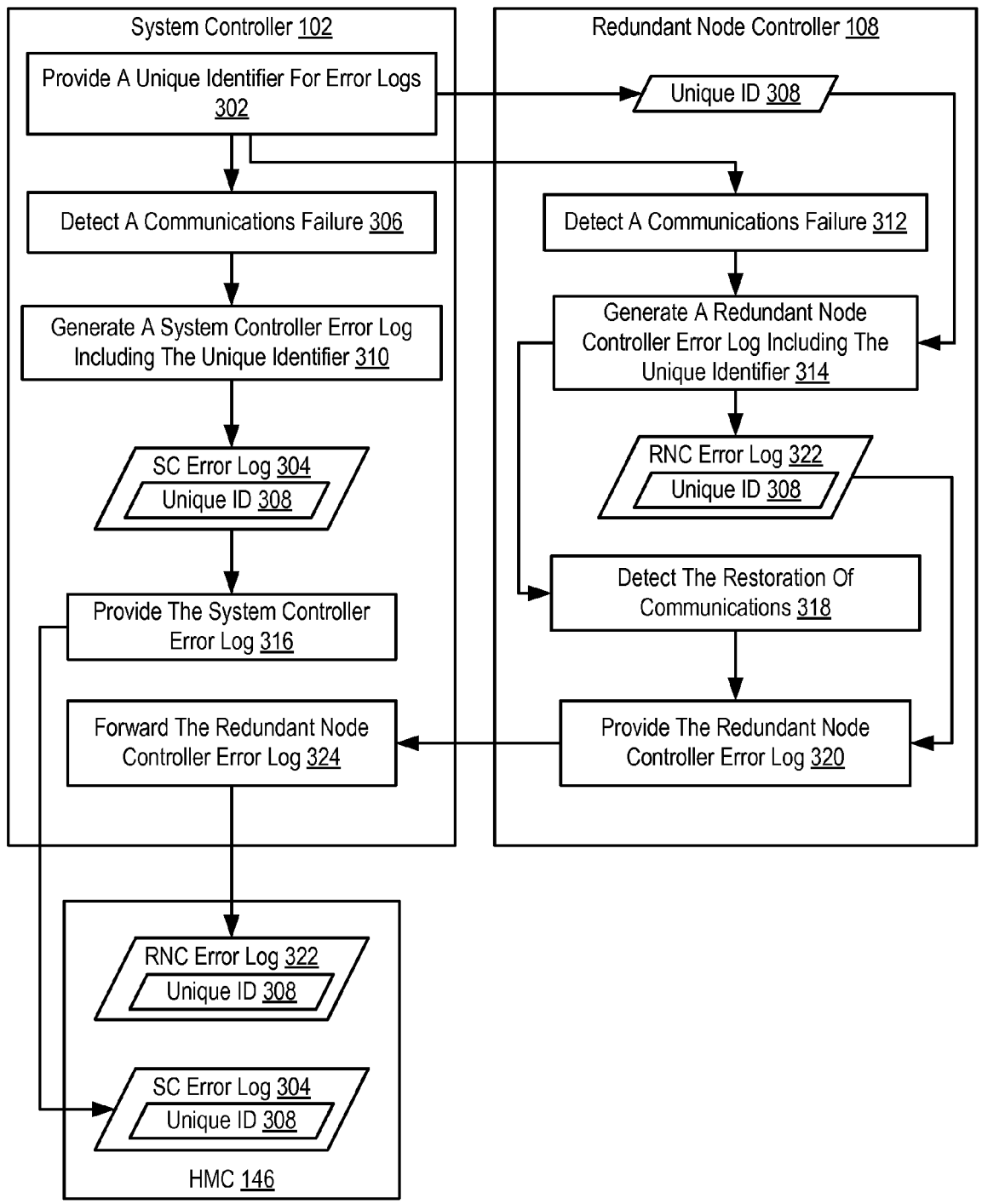
FIG. 2 sets forth a flow chart illustrating an exemplary method for administering correlated error logs in a computer system according to embodiments of the present invention.

For further explanation, FIG. 2 sets forth a flow chart illustrating an exemplary method for administering correlated error logs in a computer system according to embodiments of the present invention. The method of FIG. 2 includes providing (302) by the system controller (102) to a redundant node controller (108) a unique identifier (308) for error logs. Providing (302) by the system controller (102) to a redundant node controller (108) a unique identifier (308) for error logs is carried out by transmitting, upon establishing communications between the system controller and redundant node controller, to the redundant node controller a Universally Unique Identifier ('UUID').

The method of FIG. 2 also includes detecting (306) by the system controller (102) a communications failure between the system controller (102) and the redundant node controller (108). Detecting (306) by the system controller (102) a communications failure between the system controller (102) and the redundant node controller (108) is carried out by identifying by the system controller (102) a failure by the redundant node controller to respond to a ping of a heartbeat for a predefined period of time (404).

In response to detecting (306) the communications failure, the method of FIG. 2 continues by generating (310) by the system controller (102) a system controller error log (304) for the communications failure including the unique identifier (308). Generating (310) by the system controller (102) a system controller error log (304) for the communications failure including the unique identifier (308) is carried out by recording, in a data structure, operational information of the redundant node controller corresponding to the communications failure and inserting the unique identifier in the data structure.

The method of FIG. 2 also includes providing (316) by the system controller (102) the system controller error log (304) to a hardware management console (146). Providing (316) by the system controller (102) the system controller error log (304) to a hardware management console (146) is carried out by transmitting the error log (304) to the hardware management console (146) through an in-band data communications link according to any data communication protocol including, for example, TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. The hardware management console (146) enables users and system administrators to use the error log to identify the underlying source causing the error.

The method of FIG. 2 also includes detecting (312) by the redundant node controller (108) the communications failure between the system controller (102) and the redundant node controller (108). Detecting (312) by the redundant node controller (108) the communications failure between the system controller (102) and the redundant node controller (108) is carried out by identifying by the redundant node controller (108) a failure to receive a ping of a heartbeat from the system controller (102) for a predefined period of time.

In response to detecting (312) the communications failure, the method of FIG. 2 continues by generating (314) by the redundant node controller (108) a redundant node controller error log (322) for the communications failure including the unique identifier (308). Generating (314) by the redundant node controller (108) a redundant node controller error log (322) for the communications failure including the unique identifier (308) is carried out by recording, in a data structure, operational information of the redundant node controller corresponding to the communications failure and inserting the unique identifier (308) in the data structure.

After generating the error log, the redundant node controller attempts to restore communication with the system controller (102) by periodically broadcasting a handshake initiation message through the network switch (104). The method of FIG. 2 therefore also includes detecting (318) by the redundant node controller (108) the restoration of communications between the system controller (102) and the redundant node controller (108). Detecting (318) by the redundant node controller (108) the restoration of communications between the system controller (102) and the redundant node controller (108) is carried out by identifying a response to the handshake initiation message from the system controller (102).

In response to detecting (318) the restoration of communications, the method of FIG. 2 continues by providing (320) the redundant node controller error log (322) to the system controller (102). Providing (320) the redundant node controller error log (322) to the system controller (102) is carried out by transmitting the redundant node controller error log (322) through in-band data communications through the network switch (104) according to any data communication protocol including, for example, TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art.

The method of FIG. 2 also includes forwarding (324), by the system controller (102) to the hardware management console (146), the redundant node controller error log (322). Now having received both the system controller error log (304) and the redundant node controller error log (322), a user at the hardware management console (146) §may use the error logs to identify and debug the underlying source causing the failure of communications between the system controller and redundant node controller. The hardware management console may be configured to correlate the error logs by associating those logs having the same unique identifier.

Figure 3:
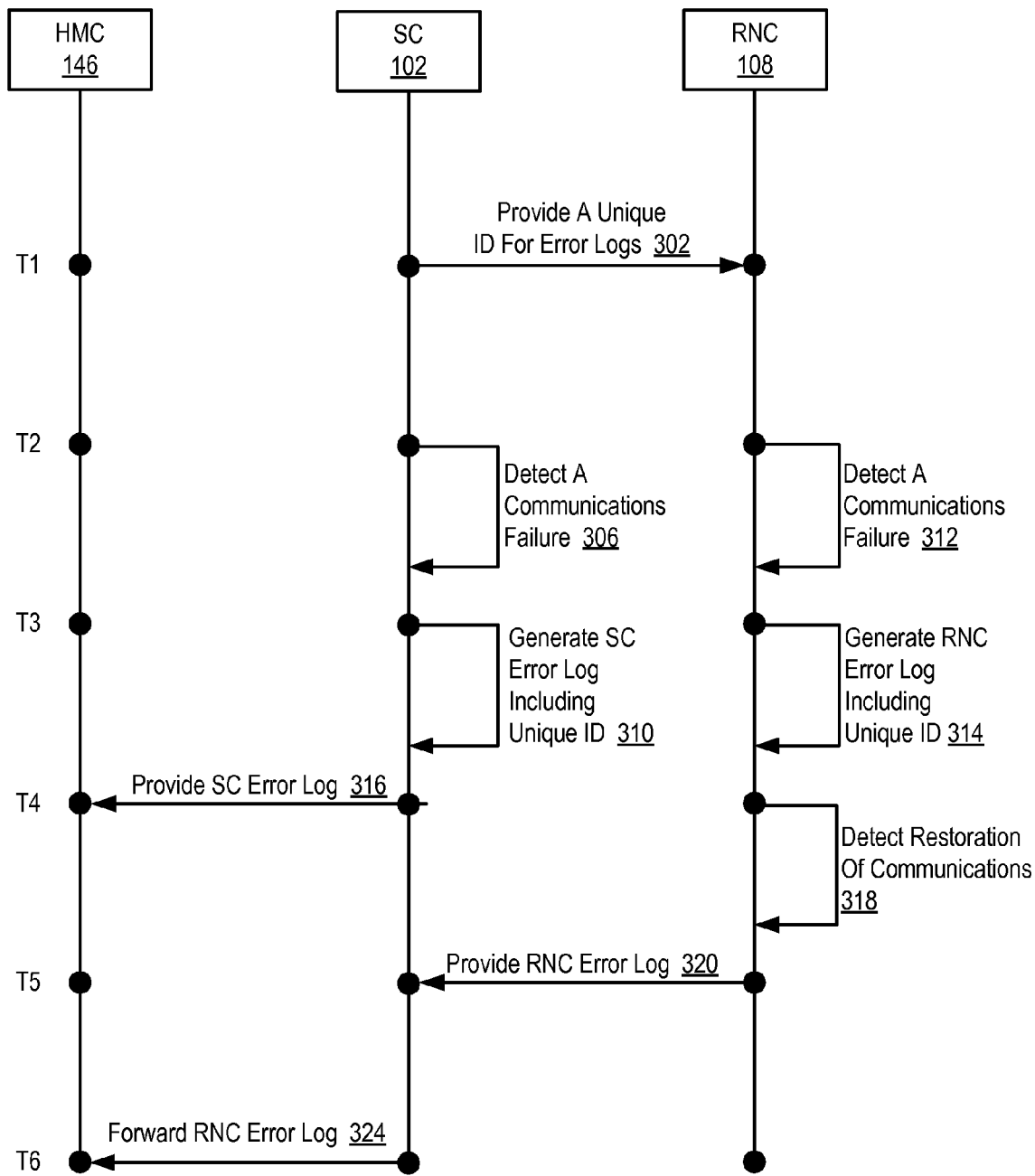
FIG. 3 sets forth a timing diagram illustrating an exemplary method for administering correlated error logs in a computer system according to embodiments of the present invention.

For further explanation, FIG. 3 sets forth a timing diagram illustrating an exemplary method for administering correlated error logs in a computer system according to embodiments of the present invention. The exemplary timing diagram includes six timing increments, T1-T6. The timing diagram also includes three devices, the hardware management console ('HMC') (146), the system controller ('SC') (102), and the redundant node controller ('RNC') (108).

At the timing increment, T1, the system controller (102) provides (302) to a redundant node controller (108) a unique identifier for error logs.

At timing increment, T2, the system controller (102) detects (306) a communications failure between the system controller (102) and the redundant node controller (108). Also at timing increment T2, the redundant node controller (108) detects (312) the communications failure between the system controller (102) and the redundant node controller (108).

At timing increment, T3, the system controller (102) generates (310) a system controller error log for the communications failure including the unique identifier. Also at timing increment T3, the redundant node controller (108) generates (314) a redundant node controller error log for the communications failure including the unique identifier.

At timing increment, T4, the system controller (102) provides (316) the system controller error log to a hardware management console (146). Also at timing increment, T4, the redundant node controller (108) detects (318) the restoration of communications between the system controller (102) and the redundant node controller (108).

At timing increment, T5, the redundant node controller (108) provides (320) the redundant node controller error log (322) to the system controller (102).

At timing increment, T6, the hardware management console (146) forwards (324), to the hardware management console (146), the redundant node controller error log.

The timing diagram of FIG. 3 shows only one sequence of performing the steps illustrated here, although many of the steps illustrated in the timing diagram of FIG. 3 may occur in other sequences. Readers of skill in the art will recognize that the exemplary timing diagram of FIG. 3 is for illustration only not for limitation.

Figure 4:
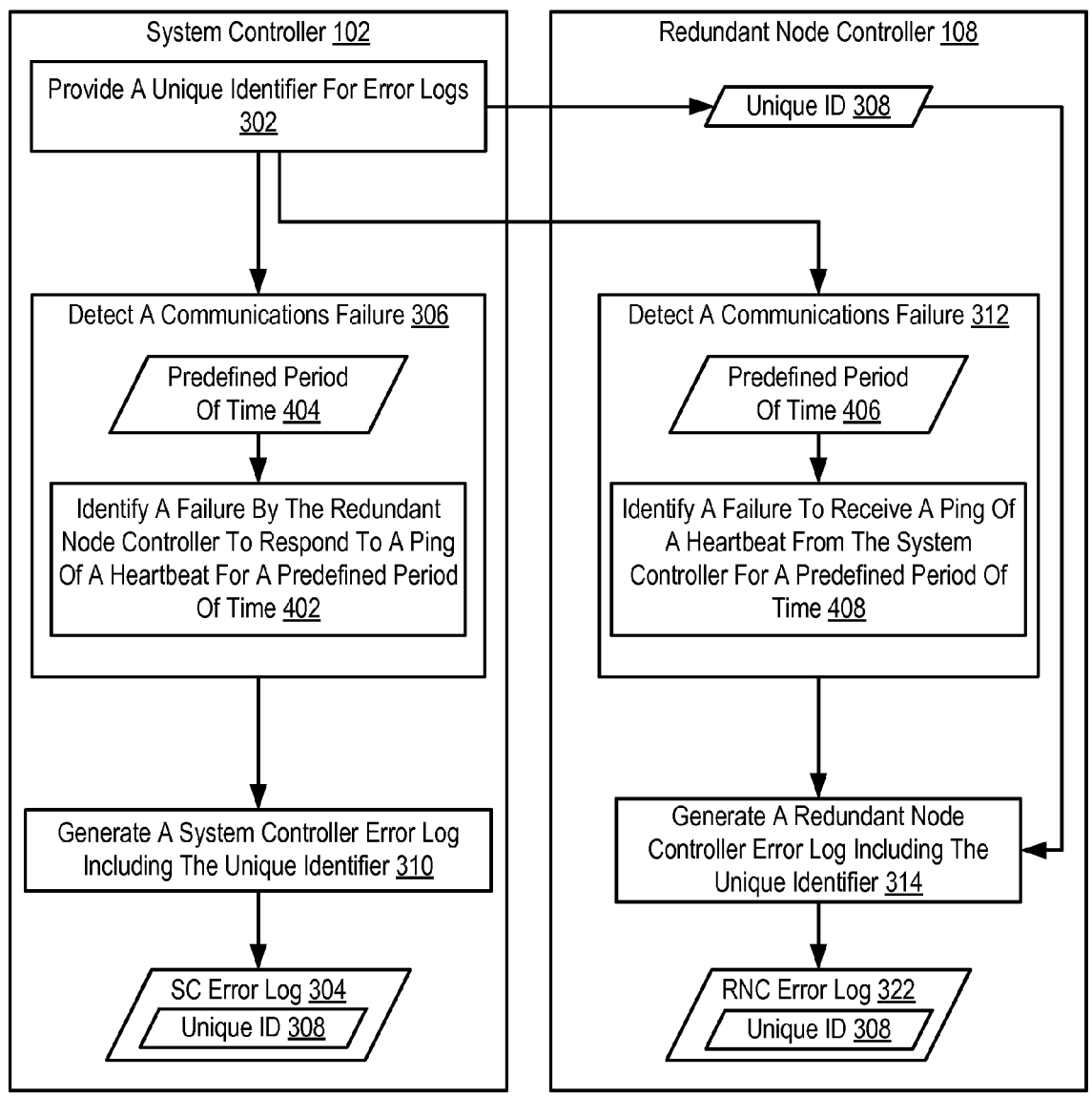
FIG. 4 sets forth a flow chart illustrating a further exemplary method for administering correlated error logs in a computer system according to embodiments of the present invention.

For further explanation, FIG. 4 sets forth a flow chart illustrating a further exemplary method for administering correlated error logs in a computer system according to embodiments of the present invention. The method of FIG. 4 is similar to the method of FIG. 2 in that the method of FIG. 4 includes providing (302) a unique identifier (308) for error logs; detecting (306) by the system controller (102) a communications failure; generating (310) a system controller error log (304) including the unique identifier (308); detecting (312) by the redundant node controller (108) the communications failure; and generating (314) a redundant node controller error log (322) including the unique identifier (308).

The method of FIG. 4 differs from the method of FIG. 2, however, in that, in the method of FIG. 4, detecting (306) by the system controller (102) a communications failure is carried out by identifying (402) by the system controller (102) a failure by the redundant node controller to respond to a ping of a heartbeat for a predefined period of time (404).

As mentioned above, the term 'heartbeat' as used in this specification is any signal shared between two devices, the existence of which represents an active communication channel between the devices. The loss of a heartbeat represents a failure of the communication channel between the devices. The heartbeat between the system controller (102) and redundant node controller (108) may consist of a ping from the system controller, through the network switch (104) to the redundant node controller (108), followed by a response from the redundant node controller.

Consider for further explanation that the predefined period of time (404) is one hour and that the system controller (102) of FIG. 4 is configured to ping the redundant node controller (108) every 15 seconds. If the system controller pings the redundant node controller every 15 seconds for one hour, but does not receive a response from the redundant node controller during the one hour, the system controller determines the loss of the heartbeat and the communications failure.

The method of FIG. 4 also differs from the method of FIG. 2 in that, in the method of FIG. 4 detecting (312) by the redundant node controller (108) the communications failure is carried out by identifying (408) by the redundant node controller a failure to receive a ping of a heartbeat from the system controller (102) for a predefined period of time (406).

Consider for further explanation that the predefined period of time (406) is 30 seconds and that the system controller (102) of FIG. 1 is configured to ping the redundant node controller (108) every 15 seconds. If the redundant node controller does not receive a ping from the system controller for 30 seconds, the redundant node controller determines the loss of the heartbeat and the communications failure.

Exemplary embodiments of the present invention are described largely in the context of a fully functional computer system for administering correlated error logs in a computer system. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for administering correlated error logs in a computer system having a system controller and one or more redundant node controllers, the method comprising:
   providing by the system controller to a redundant node controller a unique identifier for error logs;
   detecting by the system controller a communications failure between the system controller and the redundant node controller;
   in response to detecting the communications failure, generating by the system controller a system controller error log for the communications failure including the unique identifier;
   detecting by the redundant node controller the communications failure between the system controller and the redundant node controller; and
   in response to detecting the communications failure, generating by the redundant node controller a redundant node controller error log for the communications failure including the unique identifier.

2. The method of claim 1 further comprising providing by the system controller the system controller error log to a hardware management console.

3. The method of claim 1 further comprising detecting by the redundant node controller the restoration of communications between the system controller and the redundant node controller; and
   in response to detecting the restoration of communications, providing the redundant node controller error log to the system controller.

4. The method of claim 3 further comprising forwarding, by the system controller to a hardware management console, the redundant node controller error log.

5. The method of claim 1 wherein detecting by the system controller a communications failure between the system controller and the redundant node controller further comprises identifying by the system controller a failure by the redundant node controller to respond to a ping of a heartbeat for a predefined period of time.

6. The method of claim 1 wherein detecting by the redundant node controller the communications failure between the system controller and the redundant node controller further comprises identifying by the redundant node controller a failure to receive a ping of a heartbeat from the system controller for a predefined period of time.

7. An apparatus for administering correlated error logs in a computer system, the apparatus comprising a computer processor, a computer memory operatively coupled to the computer processor, the computer memory having disposed within it computer program instructions capable of:
   providing by the system controller to a redundant node controller a unique identifier for error logs;
   detecting by the system controller a communications failure between the system controller and the redundant node controller;
   in response to detecting the communications failure, generating by the system controller a system controller error log for the communications failure including the unique identifier;
   detecting by the redundant node controller the communications failure between the system controller and the redundant node controller; and
   in response to detecting the communications failure, generating by the redundant node controller a redundant node controller error log for the communications failure including the unique identifier.

8. The apparatus of claim 7 further comprising computer program instructions capable of providing by the system controller the system controller error log to a hardware management console.

9. The apparatus of claim 7 further comprising computer program instructions capable of detecting by the redundant node controller the restoration of communications between the system controller and the redundant node controller; and
   in response to detecting the restoration of communications, providing the redundant node controller error log to the system controller.

10. The apparatus of claim 9 further comprising computer program instructions capable of forwarding, by the system controller to a hardware management console, the redundant node controller error log.

11. The apparatus of claim 7 wherein detecting by the system controller a communications failure between the system controller and the redundant node controller further comprises identifying by the system controller a failure by the redundant node controller to respond to a ping of a heartbeat for a predefined period of time.

12. The apparatus of claim 7 wherein detecting by the redundant node controller the communications failure between the system controller and the redundant node controller further comprises identifying by the redundant node controller a failure to receive a ping of a heartbeat from the system controller for a predefined period of time.

13. A computer program product for administering correlated error logs in a computer system, the computer program product disposed in a computer readable, signal bearing medium, the computer program product comprising computer program instructions capable of:
   providing by the system controller to a redundant node controller a unique identifier for error logs;
   detecting by the system controller a communications failure between the system controller and the redundant node controller;
   in response to detecting the communications failure, generating by the system controller a system controller error log for the communications failure including the unique identifier;
   detecting by the redundant node controller the communications failure between the system controller and the redundant node controller; and
   in response to detecting the communications failure, generating by the redundant node controller a redundant node controller error log for the communications failure including the unique identifier.

14. The computer program product of claim 13 further comprising computer program instructions capable of providing by the system controller the system controller error log to a hardware management console.

15. The computer program product of claim 13 further comprising computer program instructions capable of detecting by the redundant node controller the restoration of communications between the system controller and the redundant node controller; and
    in response to detecting the restoration of communications, providing the redundant node controller error log to the system controller.

16. The computer program product of claim 13 further comprising computer program instructions capable of forwarding, by the system controller to a hardware management console, the redundant node controller error log.

17. The computer program product of claim 13 wherein detecting by the system controller a communications failure between the system controller and the redundant node controller further comprises identifying by the system controller a failure by the redundant node controller to respond to a ping of a heartbeat for a predefined period of time.

18. The computer program product of claim 13 wherein detecting by the redundant node controller the communications failure between the system controller and the redundant node controller further comprises identifying by the redundant node controller a failure to receive a ping of a heartbeat from the system controller for a predefined period of time.

19. The computer program product of claim 13 wherein the signal bearing medium comprises a recordable medium.

20. The computer program product of claim 13 wherein the signal bearing medium comprises a transmission medium.

\* \* \* \* \*